United States Patent [19]

Motohashi

[11] Patent Number: 5,074,394
[45] Date of Patent: Dec. 24, 1991

[54] CLUTCH COOLING APPARATUS FOR STEPLESS VARIABLE SPEED TRANSMISSION

[75] Inventor: Tomohiko Motohashi, Shizuoka, Japan

[73] Assignee: Suzuki Jidosha Kogyo Kabushiki Kaisha, Shizuoka, Japan

[21] Appl. No.: 588,761

[22] Filed: Sep. 26, 1990

[30] Foreign Application Priority Data

Sep. 30, 1989 [JP] Japan ................................ 1-256406

[51] Int. Cl.$^5$ .......................................... F16D 13/72
[52] U.S. Cl. ............................... 192/70.12; 192/113 B
[58] Field of Search .............. 192/3.57, 70.12, 85 AA, 192/113 R, 113 B

[56] References Cited

U.S. PATENT DOCUMENTS

| | | | |
|---|---|---|---|
| 3,202,253 | 8/1965 | Merritt et al. | 192/85 AA X |
| 4,270,647 | 6/1981 | Leber | 192/113 B |
| 4,436,193 | 3/1984 | Smirl | 192/113 B X |
| 4,540,078 | 9/1985 | Wetrich | 192/113 B X |
| 4,699,259 | 10/1987 | McColl | 192/70.12 |
| 4,856,628 | 8/1989 | Momiyama | 192/113 B X |

FOREIGN PATENT DOCUMENTS 62-151664  7/1987  Japan .

*Primary Examiner*—Richard Lorence
*Attorney, Agent, or Firm*—Flynn, Thiel, Boutell & Tanis

[57] ABSTRACT

A clutch cooling apparatus for a stepless variable speed transmission having a clutch for transmitting driving power from an input shaft to an output shaft by clamping a friction plate connected to the output shaft between a pressure plate and an end plate connected to the input shaft, including a first clutch cooling arrangement for cooling the clutch during a predetermined running condition of the vehicle and a second clutch cooling arrangement for cooling the clutch during operation of the vehicle engine regardless of the running condition of the vehicle.

8 Claims, 3 Drawing Sheets

CLUTCH COOLING APPARATUS FOR STEPLESS VARIABLE SPEED TRANSMISSION

FIELD OF THE INVENTION

The present invention relates to a clutch cooling apparatus for a stepless variable speed transmission which is capable of effectively cooling a clutch.

BACKGROUND OF THE INVENTION

In a power transmission apparatus of a vehicle, a clutch is provided for transmitting the driving power of the engine in response to the driving requirement.

One example of a known clutch is the wet type friction clutch, which has an end plate (clutch disc) connected to an input shaft, a pressure plate, and a friction plate connected to an output shaft and placed between the end and pressure plates. The pressure plate is operated by the pressure of clutch operating oil, and the friction plate is clamped between the end plate and the pressure plate, so that driving power is transmitted from the input shaft to the output shaft by the frictional engagement of the friction and end plates. A cooling apparatus is provided which feeds cooling oil to the portion of the friction plate which is clamped between the end and pressure plates.

A cooling apparatus for a clutch is disclosed, for instance, in Japanese Patent Laid Open Publication Gazette No. Sho-62-151664. This publication discloses cooling a clutch during its half clutch (high slippage) state when the heat generated is great.

Generally, in a cooling apparatus for a clutch, a hole is formed at the core of the input shaft, and oil is supplied through this hole so as to flow on the surface of the friction plate due to centrifugal force.

However, in the conventional clutch cooling apparatus, the clutch was cooled only in a half clutch state when much heat is generated, and was not cooled in the time either during running or not using the clutch, or during intermittent use when use of the clutch is frequently repeated as on rough and coarse roads and the like. Thus, the clutch temperature became high, whereby wear and seizing was produced, resulting in a disadvantage that the useful life of the clutch becomes shorter.

Therefore, the present invention relates to a clutch cooling apparatus for a stepless variable speed transmission capable of extending the useful life of the clutch by effectively cooling the clutch by providing a first clutch cooling means for cooling the clutch upon a predetermined running of the vehicle, and a second clutch cooling means for cooling the clutch during the driving of the engine irrespective of the running condition of the vehicle.

To accomplish the above, a stepless variable speed transmission according to the present invention includes a clutch for transmitting the driving power of the engine from an input shaft to an output shaft by clamping a friction plate between a pressure plate and an end plate connected to the input shaft, a first clutch cooling means for cooling said clutch in the time of predetermined running of said vehicle, and a second clutch cooling means for cooling said clutch during driving of said engine irrespective of the running condition of said vehicle.

According to the preferred construction of the present invention, the clutch is cooled during the time of predetermined running of the vehicle, for instance, during the half clutch state associated with starting motion of the vehicle, by a first clutch cooling means, and is simultaneously cooled constantly during engine operation by a second clutch cooling means. Consequently, since the clutch can always be surely cooled, generation of the high clutch temperature or seizing of the clutch is avoided even if intermittent use of the clutch is repeated. Hence, the useful life of the clutch can be extended.

BRIEF DESCRIPTION OF THE DRAWINGS

Hereinafter, a preferred embodiment of the present invention will be described in detail with reference to the accompanying drawings, in which.

DETAILED DESCRIPTION

Figure 1:
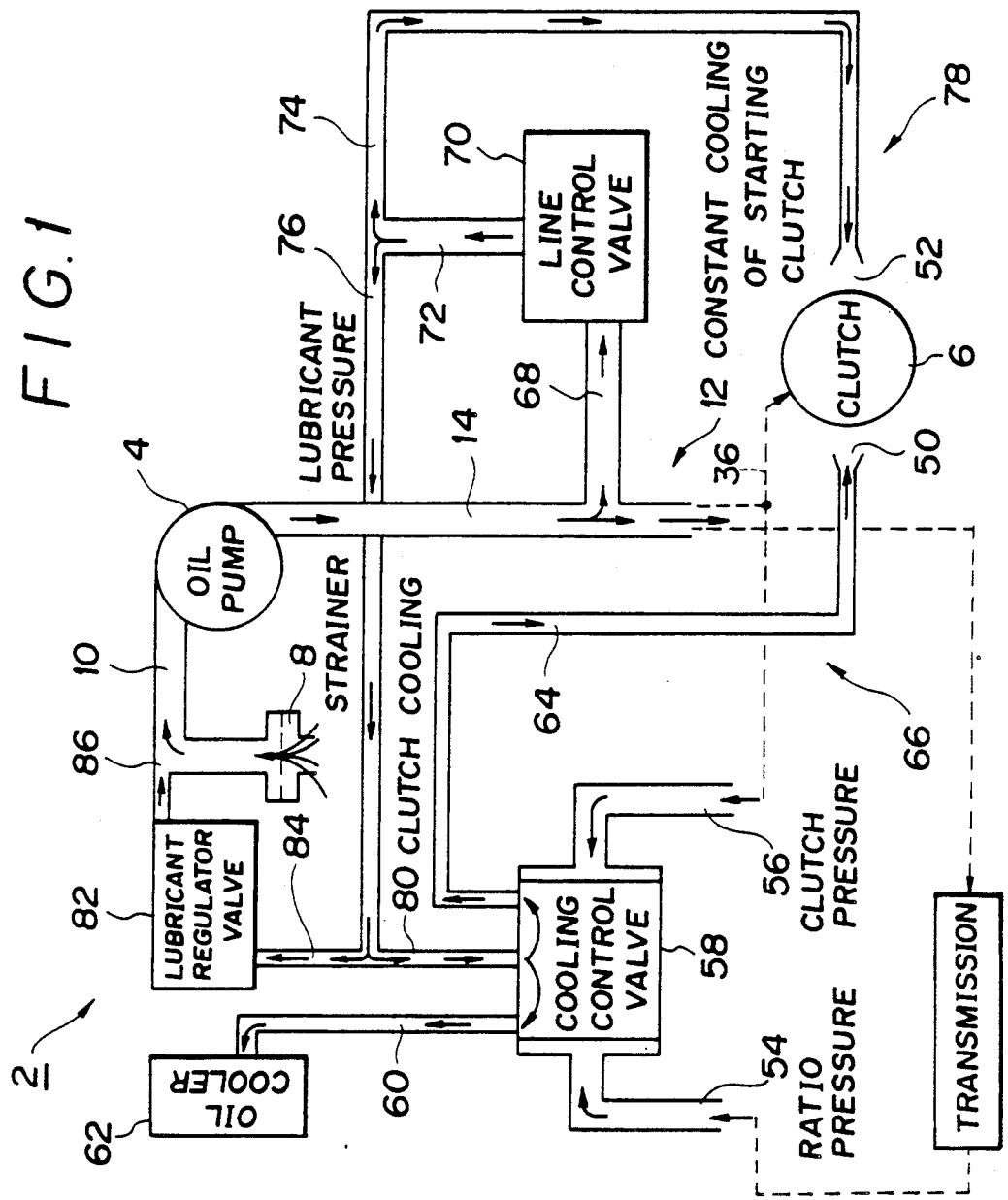
FIG. 1 is an oil pressure circuit diagram of the clutch cooling apparatus of the present invention.
Figure 2:
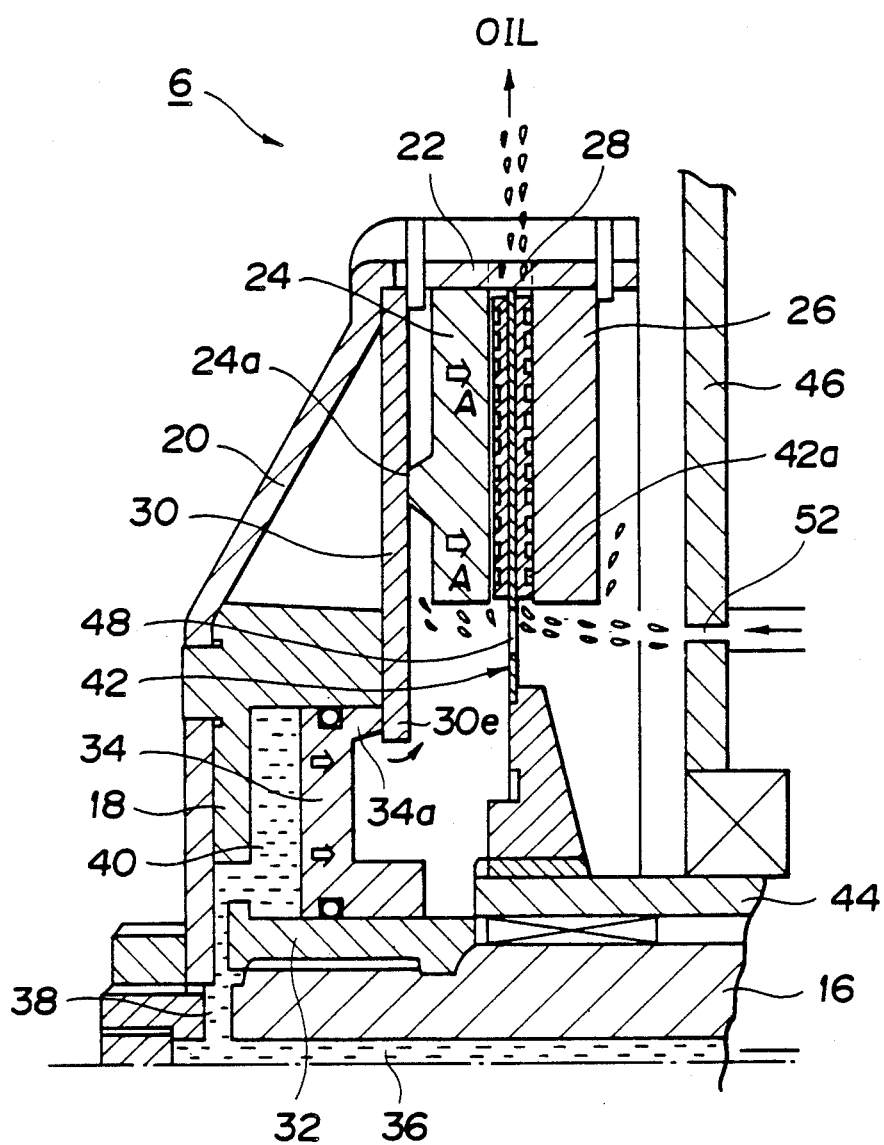
FIG. 2 is a half cross sectional view of a clutch according to the present invention.
Figure 3:
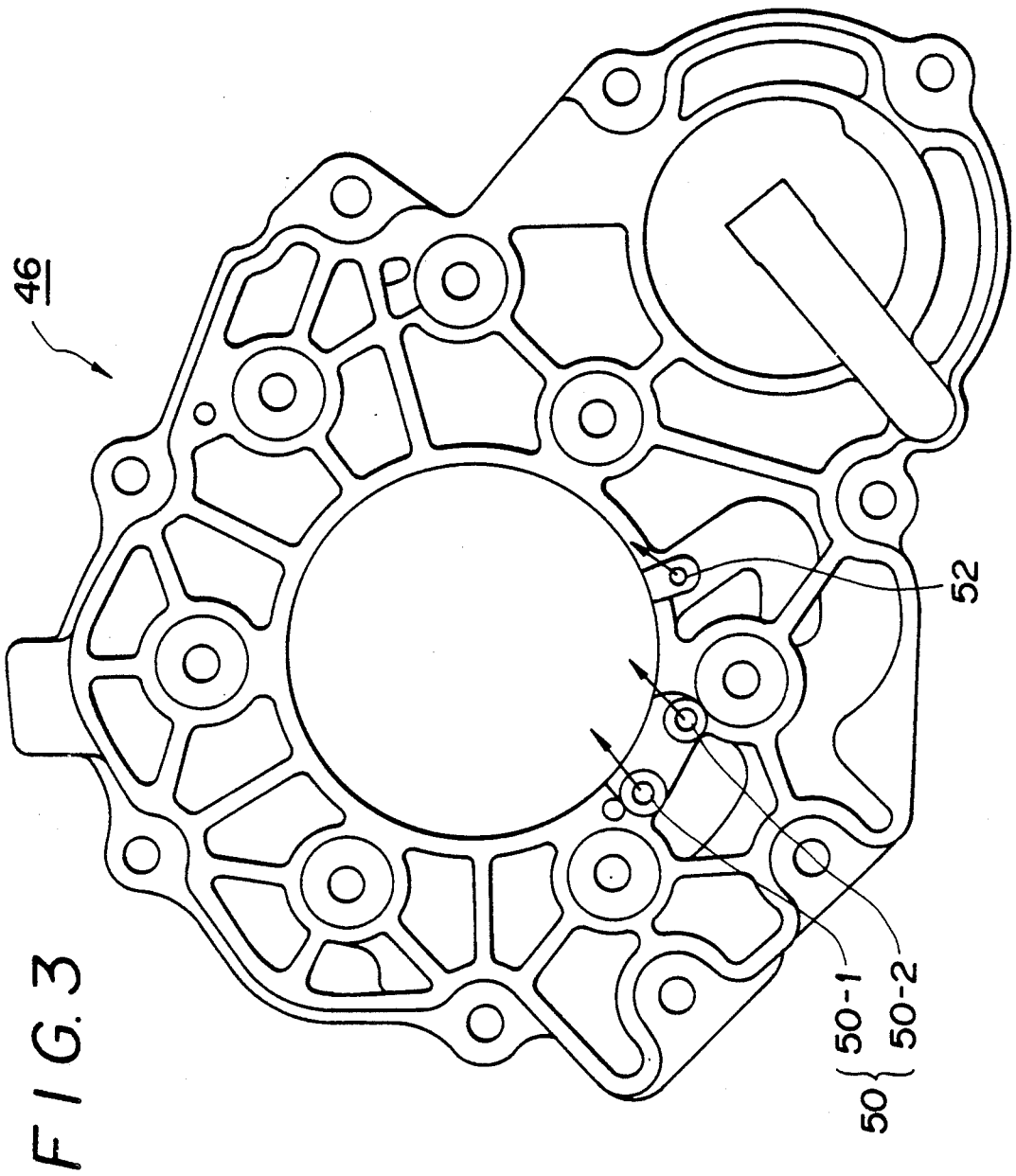
FIG. 3 is a front view of a supporting plate of the clutch of FIG. 2.

FIGS. 1 to 3 show a preferred embodiment of the present invention. In the drawings, reference numeral 2 is a clutch cooling apparatus of a stepless variable speed transmission (also known as a CVT) connected to an internal combustion engine of a vehicle, reference numeral 4 is an oil pump, and reference numeral 6 is a wet type friction clutch. The oil pump 4 is fixed to a driving side shaft (primary shaft) which is not shown, and feeds oil from an oil pan (not shown) through a strainer 8 and a suction path 10 to an oil path 14 which leads to an oil pressure circuit 12. A line pressure is applied to this first oil path 14.

The clutch 6 is constructed as shown in FIG. 2, and includes a housing hub 18 and a housing 20. The hub 18 is fixed to the housing 20, and the housing 20 is fixed to a secondary shaft 16 which is an input rotary shaft. The external peripheral edge portion 22 of this housing 20 is bent so as to be parallel with the axial direction of secondary shaft 16. A pressure plate 24 and an end plate 26 are fixed to the external peripheral edge portion 22 of this housing 20, and they define therebetween a predetermined space 28 in which a friction plate 42 is disposed. A plate spring 30 is mounted on a base side of the external peripheral edge portion 22 and is parallel with the pressure plate 24. The side surface of this plate spring 30 abuts a protruded portion 24a of the pressure plate 24. Further, the free end portion 30e of the plate spring 30 abuts an abutting portion 34a of a piston 34, which will be described hereinafter.

The piston 34 is axially slidably mounted on the external peripheral surface of a supporting member 32 which is mounted on the secondary shaft 16 and is spaced inwardly from the housing hub 18. This piston 34 is moved by clutch oil pressure applied through a clutch oil feeding path 36 formed axially in the secondary shaft 16, a clutch oil linking path 38, and a clutch oil chamber 40. The plate spring 30 is mounted so as to be able to oscillate (i.e. angularly deflect). By moving the piston 34 toward the friction plate 42 (see arrows A in FIG. 2) the lever action of this plate spring 30 moves the pressure plate 24 toward the end plate 26, so that the friction plate (clutch disc) 42 is held firmly against the end plate 26. This friction plate 42 is thus rotated with the end plate 26, and thereby the driving power from the secondary shaft 16 is transmitted to an output shaft 44 which is fixed to the friction plate 42.

A supporting plate 46 for fixing parts such as the bearing of secondary shaft 16 to a case of the transmission is arranged on the end plate 26 side of the clutch 6, as shown in FIGS. 2 and 3. This supporting plate 46 is fixed in such a manner that the lubricant of the bearings and the like does not escape exteriorly of the clutch 6.

Two first oil passing holes 50-1 and 50-2 (FIG. 3) are formed in parallel in the supporting plate 46 so as to communicate with an oil path 64 of a first clutch cooling means 66 (FIG. 1) which will be hereinafter described. A second oil passing hole 52 in the supporting plate 46 communicates with an oil path 74 of a second clutch cooling means 78. Accordingly, a large quantity of oil is fed to the clutch 6 from the two first oil passing holes 50-1 and 50-2 and the first clutch cooling means 66, and simultaneously a smaller quantity of oil is fed to the clutch 6 from the oil passing hole 52 and the second clutch cooling means 78. Friction plate 42 has one or more holes 48 therethrough so that oil in the clutch can pass on both sides of the friction plate.

In addition to clutch cooling, the oil of said oil path 14 is also used for the operation of the clutch 6 or for speed change control (belt ratio) of the transmission, and it communicates with an oil path 54 under ratio (speed change) pressure and an oil path 56 under clutch pressure. A cooling control valve 58 for operating in response to the ratio pressure and clutch pressure is connected to these oil paths 54 and 56.

An oil cooler 62 is connected to the cooling control valve 58 via an oil path 60, and the clutch 6 also communicates with the valve 58 through the oil path 64, which oil path 64 constitutes the first clutch cooling means 66. The first clutch cooling means 66 cools the clutch 6 by providing a large quantity of oil at predetermined times during the running of the vehicle, for instance, when the clutch 6 is in a half clutch state during the start of vehicle motion.

An oil path 68 branches from said oil path 14, and a line control valve 70 is connected to this oil path 68. An oil path 72 is also connected to this line control valve 70. The oil path 74, which communicates with said clutch 6, and an oil path 76, which has lubricant pressure applied thereto, both branch from oil path 72.

The oil path 74 constitutes the second clutch cooling means 78. This second clutch cooling means 78 constantly cools the clutch 6 during operation of the engine by providing a relatively small amount of oil irrespective of the running condition of the vehicle.

An oil path 80, which is connected to said cooling control valve 58, and an oil path 84, which is connected to a lubricant regulator valve 82, both branch from the oil path 76.

Excessive oil out of said lubricant regulator valve 82 is returned via an oil returning path 86 to said oil suction path 10.

The cooling control valve 58 is operated according to the balance of ratio pressure of oil path 54 with clutch pressure of oil path 56, and when the clutch 6 is in a half clutch state and the like, valve 58 is shifted so that the oil path 80 and the oil path 64 are communicated whereby the oil with lubricant pressure from the oil path 76 is fed to the clutch. When the clutch 6 is not in a half clutch state, valve 58 is shifted so that the oil path 80 and the oil path 60 are then communicated.

The operation of this embodiment will be described hereinafter.

When the internal combustion engine is driven and the vehicle is initially started in motion, the clutch 6 assumes the half clutch state wherein frictional heat generation and the associated clutch temperature becomes large, and wherein seizing and the like can easily occur. During this half clutch state, the clutch and ratio pressures at 56 and 54 cause the cooling control valve to shift so as to communicate the oil paths 80 and 64, and the oil under lubricant pressure from the oil paths 76 and 80 flows into the path 64 of the first clutch cooling means 66. This oil is fed to the clutch 6 through the first oil passing holes 50-1 and 50-2. Also at this time, oil from the oil path 74 of the second clutch cooling means 78 is fed to the clutch 6 through the second oil passing hole 52.

As shown in FIG. 2, the oil fed to the clutch 6 flows, due to centrifugal force, into a groove 42a formed on the surface of the friction plate 42, and cools the contacting portions of the end plate 26 and the friction plate 42. The oil is then discharged outwardly from the external peripheral portions of the plates 26 and 42 (refer to FIG. 2).

On the other hand, when the engine is driven either during running time while not using the clutch 6 or while the vehicle is stopped, the clutch and ratio pressures at 56 and 54 cause the cooling control valve 58 to interrupt the connection between the oil path 80 and the oil path 64 and to simultaneously shift and communicate the oil path 80 and the oil path 60. Hence, the oil of the oil path 80 reaches the oil cooler 62 through the oil path 60, and is ultimately returned to the oil pan (not shown). Since the oil paths 14 and 76 indirectly communicate with each other, constant lubricant pressure is provided in the oil paths 76 and 80 by the operation of the lubricant regulator valve 82 during the driving of the engine.

However, the oil from the oil path 74 is constantly fed to the clutch 6 through the second oil passing hole 52 by the second clutch cooling means 78. At this moment, although the oil quantity provided to the clutch 6 is less than the oil quantity from the first clutch cooling means 66, since the heat generated by the clutch 6 is less, no problem arises. Consequently, since the clutch 6 is appropriately and positively cooled even when it is not being used, even if the clutch 6 is frequently and repeatedly used on a rough and coarse road and the like, high clutch temperature can be avoided. Seizing or abnormal wear and the like are also avoided. Hence, the operational life of the clutch can be extended.

In addition, under the aforementioned circumstances where high clutch temperature and the like are not likely to occur, the amount of cooling oil supplied to the clutch 6 is decreased, and therefore the oil pump is utilized more efficiently, whereby a smaller oil pump 4 can be used, and its operational life can be increased.

Solely for reference purposes, one example of a stepless variable speed transmission is disclosed in copending application Ser. No. 07/443,712, now U.S. Pat. No. 5,024,310, as owned by the assignee hereof.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a stepless variable speed transmission of a vehicle having a clutch for transmitting the driving power of a vehicle engine from an input shaft to an output shaft by clamping a friction plate between a pressure plate and an end plate connected to the input shaft, and a clutch cooling apparatus for supplying cooling oil to the clutch, the improvement wherein said clutch cooling apparatus comprises:

first clutch cooling means for cooling said clutch upon a predetermined running condition of said vehicle; and second clutch cooling means for cooling said clutch during driving of said engine irrespective of the running condition of said vehicle, including conduit means for continuously carrying cooling oil to said clutch whenever the engine is operating.

2. The apparatus according to claim 1, wherein said clutch is a friction type clutch, said first clutch cooling means including an oil pump for pumping cooling oil, further conduit means connected between said oil pump and said clutch for carrying cooling oil from said oil pump to said clutch, and valve means for selectively interrupting the flow of cooling oil from said oil pump through said further conduit means to said clutch depending on the frictional engagement state of said clutch.

3. The apparatus according to claim 2, wherein said first clutch cooling means includes an oil cooling device, said valve means including means for establishing a fluid path between said further conduit means and said oil cooling device when said oil flow to said clutch is interrupted to permit cooling of said cooling oil while said cooling oil is not being used to cool said clutch.

4. In a stepless variable speed transmission of a vehicle having a clutch for transmitting the driving power of a vehicle engine from an input shaft to an output shaft by clamping a friction plate between a pressure plate and an end plate connected to the input shaft, and a clutch cooling apparatus for supplying cooling oil to the clutch, the improvement wherein said clutch cooling apparatus comprising:

first clutch cooling means for cooling said clutch upon a predetermined running condition of said vehicle;

second clutch cooling means for cooling said clutch during driving of said engine irrespective of the running condition of said vehicle;

said clutch being a friction type clutch, said first clutch cooling means including an oil pump for pumping cooling oil, first oil condition means connected between said oil pump and said clutch for carrying cooling oil from said oil pump to said clutch, and valve means for selectively interrupting the flow of cooling oil from said oil pump to said clutch depending on the frictional engagement state of said clutch; and said second clutch cooling means including a second conduit means connected between said oil pump and said clutch for continuously carrying cooling oil from said oil pump to said clutch whenever the vehicle engine is operating, said first conduit means being dimensioned so as to permit a substantially larger amount of cooling oil to flow therethrough than said second conduit means.

5. The apparatus according to claim 2, wherein said clutch has means including a variable volume oil chamber for effecting engagement of said friction plate and said end plate, said valve means including a control valve having a control inlet port, and said first clutch cooling means including means for permitting fluid communication between said inlet port of said control valve and said oil chamber of said clutch.

6. In a vehicle transmission apparatus including a stepless variable speed transmission, a friction type hydraulic clutch, and a clutch cooling apparatus for supplying cooling oil to said clutch, the improvement wherein said clutch cooling apparatus comprises: a first clutch cooling means for constantly and continuously supplying a first quantity of cooling oil to said clutch, and a selectively actuable second clutch cooling means operable simultaneously with and in addition to said first clutch cooling means for selectively supplying to said clutch a second quantity of cooling oil which is substantially larger than said first quantity of cooling oil, and actuation means responsive to a predetermined frictional engagement state of said clutch for effecting selective actuation of said second clutch cooling means.

7. The apparatus according to claim 6, wherein said second clutch cooling means includes an oil pump for pumping cooling oil, a first conduit means connected between said oil pump and said clutch for carrying cooling oil from said oil pump to said clutch, and a valve means for selectively interrupting the flow of cooling oil from said oil pump to said clutch in said first conduit means, said actuation means including second and third conduit means for carrying operational hydraulic oil from said clutch and said transmission, respectively, to said valve means.

8. The apparatus according to claim 7, wherein said second clutch cooling means includes an oil cooling device, said valve means including means for connecting said oil cooling device to said first conduit means simultaneously with said interruption of flow of cooling oil from said oil pump to said clutch.

* * * * *

UNITED STATES PATENT AND TRADEMARK OFFICE
CERTIFICATE OF CORRECTION

PATENT NO.   : 5,074,394
DATED        : December 24, 1991
INVENTOR(S)  : Tomohiko Motohashi It is certified that error appears in the above-identified patent and that said Letters Patent is hereby corrected as shown below:

Column 5, line 50; change "condition" to ---conduit---.

Signed and Sealed this

First Day of June, 1993

Attest:

MICHAEL K. KIRK

Attesting Officer    Acting Commissioner of Patents and Trademarks